3,297,516
PROCESS FOR DISPERSING ASBESTOS
Alfred W. Naumann, Suffern, and William H. Dresher, Warwick, N.Y., assignors to Union Carbide Corporation, a corporation of New York
No Drawing. Filed Aug. 28, 1963, Ser. No. 305,217
10 Claims. (Cl. 162—3)

This invention relates to a process for producing a stable suspension of finely divided, highly surface active, chrysotile asbestos. More particularly, it relates to the process of contacting an aqueous slurry of asbestos fibers with an aqueous polymolecular colloid and then applying high speed shearing forces to the slurry.

Chrysotile asbestos generally occurs in mineral deposits in the form of closely packed fibers of varying lengths. In order for this asbestos to be used most effectively in the formaiton of useful products, such as asbestos paper, asbestos-filled tile and the like, it must be opened and the individual fibers substantially separated from each other. Generally this is accomplished by various mechanical means whereby the closely packed asbestos fibers are mechanically and physically forced apart. While this technique is somewhat successful in separating a substantial portion of the fibers from each other and at the same time liberating a large portion of the gangue materials contained in physical mixture with the asbestos, additional treatment is required to prepare an asbestos product which is virtually free of this gangue. The opened fibers can be somewhat separated from the gangue and gross impurities by mechanical separation means, such as screens and the like. Unfortunately, the mechanical means which open the asbestos fibers also break up the gangue and impurities and thus increase the difficulty of separating the asbestos fibers from such impurities. Naturally-occurring chrysotile asbestos is composed of separate and discrete individual fibrils adhering together to form fiber bundles. These fibrils are colloidally sized, having a diameter of from about 200 to about 800 angstrom units and variable length of several microns. Several techniques have been proposed in the prior art to chemically disperse the asbestos fibrils and thus obtain more complete separation of individual fibrils from each other and from gangue and other impurities. Such chemical dispersion techniques are described in U.S. 1,907,616; 2,661,287; 2,626,213 and 3,062,701, for example. Such prior art techniques have not been commercially successful. Some of their draw-backs or disadvantages are as follows. The processes described in 1,907,616 and 2,661,287 require a large quantity of soluble salt, such as aluminum chloride, to be present in the aqueous asbestos slurry. The large amount of anions, such as chloride, present in the solution tends to decrease the stability of the dispersed asbestos and thus floccultae or bring together the dispersed fibers. The processes described in 2,626,213 and 3,062,701 employ an organic surfactant for dispersion of asbestos fibers. The process of 2,626,213 has limited utility in the production of dispersed individual asbestos fibrils since mechanical agitation of the surfactant-asbestos mixture to aid in fiber separation will cause undesirable frothing which increases the handling problems. The process described in 3,062,701 was intended to eliminate the undesirable frothing, but it has the disadvantage that a true stable dispersion is not formed. A temporary dispersion is formed which quickly reverts to a clotted condition.

It has now been found that stable suspensions of finely divided chrysotile asbestos can be obtained without encountering the difficulties of the prior art. This improved process comprises contacting an aqueous slurry of chrysotile asbestos with a metal aluminate selected from the class consisting of sodium aluminate, potassium aluminate, calcium aluminate and barium aluminate, adding a monobasic acid selected from the class consisting of acetic acid, formic acid, hydrochloric acid, and nitrous acid until the pH of the resulting aqueous slurry is from about 4.0 to about 6.0, thereby forming a highly charged, strongly adsorbable, polymolecular colloid of aluminum hydroxide or hydrated aluminum oxide, and then applying high speed shearing forces to the slurry. When this process is carried out according to the teaching described herein, decreased quantities of interfering monovalent anions will be formed, as contrasted with the large quantities of interfering anions of the prior art, and thus asbestos dispersions of superior stability and quality are conveniently prepared.

According to the present invention, the chrysotile asbestos to be treated need not be previously opened; however, at least partial opening of the asbestos is desirable. Any of the well-known techniques for opening asbestos can be employed. This opening can take place before the asbestos is added to water to form a slurry or the opening can take place after the asbestos slurry is formed. Brititsh Patent 562,121, for example, describes a technique for opening a wet asbestos slurry. The asbestos employed in the present invention preferably should be in the form which after opening has fibers having the Quebec Asbestos Producers Association Classification of Grade 5 to Grade 7 inclusive. Grade 5 is a long fiber form of asbestos while Grade 7 is a short fiber form of asbestos. The asbestos is employed in an amount to prepare an asbestos-water slurry containing from about 0.5 to about 7 weight percent chrysotile asbestos. If the slurry contains less than 0.5 weight percent asbestos, the resulting asbestos dispersion will be too dilute for efficient processing. When the slurry contains more than about 7 weight percent asbestos, the viscosity greatly increases and the slurry is difficult to handle. Preferably, the slurry contains from about 1.0 to about 6.0 weight percent chrysotile asbestos. The asbestos is then contacted with a metal aluminate selected from the class consisting of sodium aluminate, potassium aluminate, calcium aluminate and barium aluminate. The metal aluminate is preferably added to the asbestos-water slurry but alternatively the metal aluminate can be present in the aqueous solution to which the opened asbestos is added or in which the asbestos is opened. The amount of metal aluminate employed in the present invention is not narrowly critical. A minimum amount of about 0.0007 mole of aluminum contained within the aluminate portion of the metal aluminate should be present for each liter of chrysotile asbestos-water slurry. A maximum amount of about 0.05 mole of aluminum contained within the aluminate portion should be present for each liter of slurry. Amounts less than the minimum amount do not result in satisfactory asbestos dispersions while amounts in excess of the maximum amount result in gel formation or excessive foaming.

The monobasic acid which reacts with the metal aluminate to form a highly charged, strongly adsorbable, poly-molecular colloid is acetic acid, formic acid, hydrochloride acid or nitrous acid. These acids produce acetate, formate, chloride or nitrite anions which can be conveniently tolerated by the chrysotile asbestos slurry and do not tend to flocculate the slurry as readily as do the anions from other acids. It is important that the acid be added to the asbestos slurry containing the metal aluminate so that the useful pH range of from about 4.0 to about 6.0 is approached from the alkaline or high pH side. This procedure of addition will form the colloid of aluminum hydroxide or hydrated aluminum oxide without forming an ionizable aluminum salt.

The amount of acid added should be in excess of the amount necessary to convert the metal aluminate to the aluminum hydroxide or hydrated aluminum oxide but should be less than the amount necessary to convert the metal aluminate to soluble, unhydrolyzed aluminum cations. Such conditions will be met when the final pH is within the above described range. The actual amount of acid added will depend upon the concentration of asbestos, the amount of metal aluminate, the aluminate composition and the acid composition and concentration. Preferably the monobasic acid should be added until the pH of the asbestos slurry is from about 4.5 to about 5.5 Preferably the metal aluminate is sodium aluminate and the acid is acetic acid. As an example of the advantages of the present invention, it should be noted that when sodium aluminate is reacted with hydrochloric acid to form aluminum hydroxide colloid as described herein, about 67 mole percent less chloride anion is present in the final solution then would be present if the prior art aluminum chloride reaction with sodium hydroxide were used to produce the same amount of aluminum hydroxide. This substantial decrease in chloride anion content enables the resulting asbestos dispersion to be stable for a longer time and actually enables a higher quality dispersion to be obtained. The present invention also avoids the formation of soluble salts, such as aluminum chloride. The dispersing process is extremely sensitive to the presence of soluble salts in the asbestos slurry at the time of dispersing. Likewise, the stability of the dispersion once formed, is extremely sensitive to the presence of soluble salts. The effect of the presence of soluble salts is to decrease the stability of an asbestos dispersion from several days or weeks at low concentrations of soluble salts to zero time at high concentrations of soluble salts. Stability of an asbestos dispersion is measured in terms of time at which the viscosity of the dispersion remains at a relatively low value in the order of 1–10 centipoises at 25° C.

In order to maintain a stable asbestos dispersion for relatively long periods of time, it is desirable and preferable that the asbestos slurry contain negligible amounts of fluoride anions and divalent anions, such as sulfate. Such anions tend to flocculate the asbestos dispersion.

Mechanical energy in the form of high speed shearing forces must be applied to the asbestos-water-colloid slurry mixture in order to attain satisfactory dispersion of the asbestos fibrils. This mechanical agitation can be accomplished with any device capable of rendering a high proportion of its energy into shear forces. Examples of such equipment for laboratory use are the Waring Blendor, the Wemco attrition mill, the Brookfield counter-rotating mixer, the Vir-tis homogenizer or other forms of laboratory colloid mills. Ultrasonic "cleaning" equipment can also be used for this purpose. In commercial practice, machines such as the conventional papermaker's disintegrators, beaters, and refiners, such as the Valley beater, the Jordan engine, and the Claflin refiner can be employed. Also, those machines familiar to the mineral processing industry which provide both impact and attrition action, such as a wet hammermill, the Fitzpatrick comminution machine or the Micro-Pulverizer, or even the conventional ball mill, can be employed. For the purpose of this invention this subsequent agitation of the asbestos-water-colloid slurry should be limited to interfibril comminution in order to preserve the ultimate fibril size distribution which is native to the asbestos rock, thus preventing further size reduction of the individual fibrils. This will also tend to reduce any reduction in size of gangue and other impurities and improve the ease of separation of the dispersed asbestos from such impurities.

Dispersions of chrysotile asbestos prepared according to the present invention have a viscosity of from about 1 to about 10 centipoises at 25° C. In this state, a dispersion of asbestos exhibits a characteristic "shimmer" or pearlescence due to the reflection of light from the preferred alignment of asbestos fibrils in suspension. The quality of a dispersion can, in fact, be determined by measuring the viscosity of the dispersion and recording the viscosity reading as a function of time. The lower the initial viscosity reading and the longer this reading remains substantially constant, the better is the dispersion. The viscosity relationships of an asbestos dispersion are functions of the particular dispersing reagents employed, the pH of the dispersion, the kind and amount of anions present in the solution and the concentration and grade of asbestos employed. The quality of an asbestos dispersion is dependent upon the chemical, and to some extent the physical, conditions present in the system during and after dispersion. The stability of asbestos dispersions (a quality measurement) is expressed in terms of "gel-time." Gel-time is defined as the time it takes for a low viscosity asbestos dispersion to reach a viscosity which is out of the "dispersed" viscosity region and into the "gel" viscosity region. The transition from the dispersed state to the gel state is marked by a sudden and continuous rise in viscosity with an eventual leveling off in the region of about 50 to greater than 100 centipoises at 25° C. Having reached the gel-point the asbestos suspension loses the shimmer which is characteristic of asbestos in the dispersed form and acquires a homogeneous, static appearance. There is no visual evidence of a two-phase system and the gel can range in viscosity to the point at which it cannot be poured from a container.

The amount of mechanical energy which has been applied to the system during dispersion has little effect on the viscosity of the dispersed phase. It does, however, have a great effect on the amount of asbestos which is placed into the dispersed phase; i.e., on the efficiency of the dispersion. Thus, in describing the dispersion process, it is necessary to consider both the quality of dispersion which has been obtained, and the efficiency at which the dispersion has been obtained. Efficiency is dependent upon the total amount of mechanical energy which has been put into the system together with the nature of the mechanical forces applied.

Asbestos dispersions prepared in accordance with the present inventions are useful per se as a source of finely-divided asbestos. These dispersions can be used as additives to cellulosic paper to improve the softness and retention of cellulose fines, filler fines and whitening agent fines. Formation of an asbestos dispersion according to the present invention is also a very useful step in the purification of asbestos. Gangue and other impurities are eaily separated by gravity methods from a stable asbestos dispersion. The resulting purified asbestos dispersion can be used "as is" or the asbestos can be flocculated, filtered and dried. The resulting flocculated asbestos mass can be used in conventional asbestos products requiring short fiber asbestos. Flocculation of the asbestos dispersion can take place in several ways. Adjustment of the pH of the dispersion outside of the range of about 4.0–6.0 can cause gelation and flocculation. Presence of an interfering anion, such as fluoride or sulfate, can also cause flocculation. The addition of a gross excess of asbestos to the dispersion could also cause flocculation. A state of flocculation exists when two phases become obvious—a clear solution phase and a curd-like gel phase. The flocculated asbestos is easier to filter than is the asbestos dispersion or an asbestos gel.

Any form of chrysotile asbestos can be employed in the present invention. It is preferred that the asbestos have a fiber length in the range of Grade 5 to Grade 7. It is further preferred that the asbestos be in the form of the short fiber material obtained from deposits near Coalinga, California.

While not intending to be limited thereby, the following is one explanation of what takes place during the dispersing of asbestos according to the present invention. The reaction between the metal aluminate and the monobasic acid forms a highly charged, strongly adsorbable, polymolecular colloid of aluminum hydroxide or hydrated aluminum oxide. This colloid is then adsorbed onto the surfaces of the opened asbestos fibrils to envelop the fibrils with a continuous coating or at least a partial coating of the electrically-charged colloid. The charged fibrils, all have approximately the same level of like charges tend to repel each other and thus become highly dispersed. The mechanical agitation is necessary to defilibrate the fiber brindles and to intimately mix the colloid and the asbestos fibrils. These fibrils thus have considerably increased resistance to re-agglomeration and to chemical attack on the fibrils.

The present invention is further described in the following examples.

*Example 1*

Three hundred milliliters of deionized water were placed in the glass container of a Waring Blendor. Six grams of dry opened short fiber (Grade 7) chrysotile asbestos from Coalinga, California, were added to the water. Three milliliters of 0.1 molar sodium aluminate were added to the asbestos-water mixture. The blender was turned on at high speed (about 10,000 r.p.m.) and acetic acid was slowly dropped into the mixing slurry until the pH of 4.5 was reached and remained steady. After three minutes of total agitation time the blender was turned off. The resulting asbestos-water-colloid dispersion was poured into a 300 milliliter tall-form breaker. During the pouring it was noted that the asbestos dispersion had a pearlescent shimmer which continued for several seconds after the pouring was completed. This dispersion had a viscosity of 1.5 centipoises at 25° C. as measured by a Brookfield Type LVF viscosimeter using a No. 1 spindle at 60 r.p.m. The asbestos suspension remained in the breaker without movement for ten minutes. During that time small dark colored particles could be seen falling downward in the suspension. At the end of the time interval the suspension was decanted from the original beaker into a second breaker. The residue remaining in the first beaker was greenish brown in color and had small speaks of black material mixed throughout. The residue was gritty to the feel. A portion of the decanted suspension was flocculated by the addition of a few drops of 10 weight percent sodium sulfate solution. The flocculated suspension was vacuum filtered to form a matted asbestos filter cake, which was removed from the filter in a coherent mass and dried. The wet cake contained 23 weight percent water and when dry had a brightness of 75 percent when measured against a standard magnesite block using light having a wave length of 457 millimicrons. The remainder of the decanted suspension was centrifuged at 1000 r.p.m. for five minutes. The supernatant liquid was decanted off and flocculated by sodium sulfate. The flocculated suspension was vacuum filtered and dried as described above. The dry cake had a brightness of 85 percent when measured in the same manner as above. This high brightness indicates a highly pure asbestos.

*Example 2*

Two hundred and sixty-five milliliters of deionized water were placed in the glass container of a Waring Blendor. Eighteen grams of dry Grade 7 short fiber chrysotile asbestos from Quebec, Canada, was added to the water. Twenty-five milliliters of a 0.1 molar solution of sodium aluminate and 10 milliliters of 1.0 molar acetic acid were added in that order to the mixture. The slurry was agitated at high speed for three minutes. The resulting suspension had the pearlescent shimmer characteristics of the dispersed state and dark-colored impurity particles could be observed settling out of the suspension. The asbestos suspension was decanted into a 300 milliliter tall-form breaker. This suspension had a pH of 5.0 and a viscosity of 5.0 centipoises at 25° C.

While the above examples employed sodium aluminate and acetic acid as the dispersing reagents, it should be understood that similar results can be obtained by employing aluminates of potassium, calcium or barium as well as hydrochloric acid, formic acid or nitrous acid.

What is claimed is:

1. A process for the preparation of a stable suspension of finely divided chrysotile asbestos which comprises contacting an aqueous slurry of chrysotile asbestos with a metal aluminate selected from the class consisting of sodium aluminate, potassium aluminate, calcium aluminate and barium aluminate, adding a monobasic acid selected from the class consisting of acetic acid, formic acid, hydrochloric acid, and nitric acid until the pH of the resulting aqueous slurry is from about 4.0 to about 6.0, thereby forming a highly charged, strongly adsorbable, polymolecular colloid of material selected from the class consisting of aluminum hydroxides and hydrated aluminum oxides and then applying high speed shearing forces to the slurry.

2. A process as claimed in claim 1 wherein the metal aluminate is sodium aluminate.

3. A process as claimed in claim 1 wherein the monobasic acid is acetic acid.

4. A process as claimed in claim 1 wherein the metal aluminate is sodium aluminate and the monobasic acid is acetic acid.

5. A process as claimed in claim 4 wherein the acetic acid is added until the pH of the aqueous slurry is from about 4.5 to about 5.5.

6. A process as claimed in claim 1 wherein the aqueous slurry of chrysotile asbestos contains from about 0.5 to about 7.0 weight percent chrysotile asbestos.

7. A process as claimed in claim 1 wherein the aqueous slurry of chrysotile asbestos contains from about 1.0 to about 6.0 weight percent chrysotile asbestos.

8. A process as claimed in claim 1 wherein the aqueous slurry of chrysotile asbestos contains asbestos fibers having the Quebec Asbestos Producers Association Classification of Grade 5 to Grade 7 inclusive.

9. A process for the preparation of highly pure chrysotile asbestos fibers which comprises forming a stable suspension of finely divided chrysotile asbestos by contacting an aqueous slurry of chrysotile asbestos with a metal aluminate selected from the class consisting of sodium aluminate, potassium aluminate, calcium aluminate and barium aluminate, adding a monobasic acid selected from the class consisting of acetic acid, formic acid, hydrochloric acid and nitrous acid until the pH of the resulting aqueous slurry is from about 4.0 to about 6.0, thereby forming a highly charged, strongly adsorbable, polymolecular colloid of material selected from the class consisting of aluminum hydroxides and hydrated aluminum oxides, and applying high speed shearing forces to the slurry, and then separating gangue and other impurities from the stable suspension of finely divided chrysotile asbestos.

10. A process as claimed in claim 9 wherein the resulting purified stable suspension of finely divided chrysotile asbestos is then flocculated.

References Cited by the Examiner

UNITED STATES PATENTS

| | | | |
|---|---|---|---|
| 1,907,616 | 5/1933 | Tucker | 162—153 |
| 2,661,287 | 12/1953 | Barbaras | 252—313 X |
| 2,685,825 | 8/1954 | Novak | 162—155 |
| 3,062,701 | 11/1962 | Novak | 162—145 |

DONALL H. SYLVESTER, *Primary Examiner.*

H. CAINE, *Assistant Examiner.*